July 22, 1924.

F. B. MARVIN

WAVE MOTOR

Filed Aug. 11, 1922  3 Sheets-Sheet 1

1,502,511

WITNESS

INVENTOR,
Frederick B. Marvin,
BY
ATTORNEY.

July 22, 1924.
F. B. MARVIN
WAVE MOTOR
Filed Aug. 11, 1922    3 Sheets-Sheet 2
1,502,511
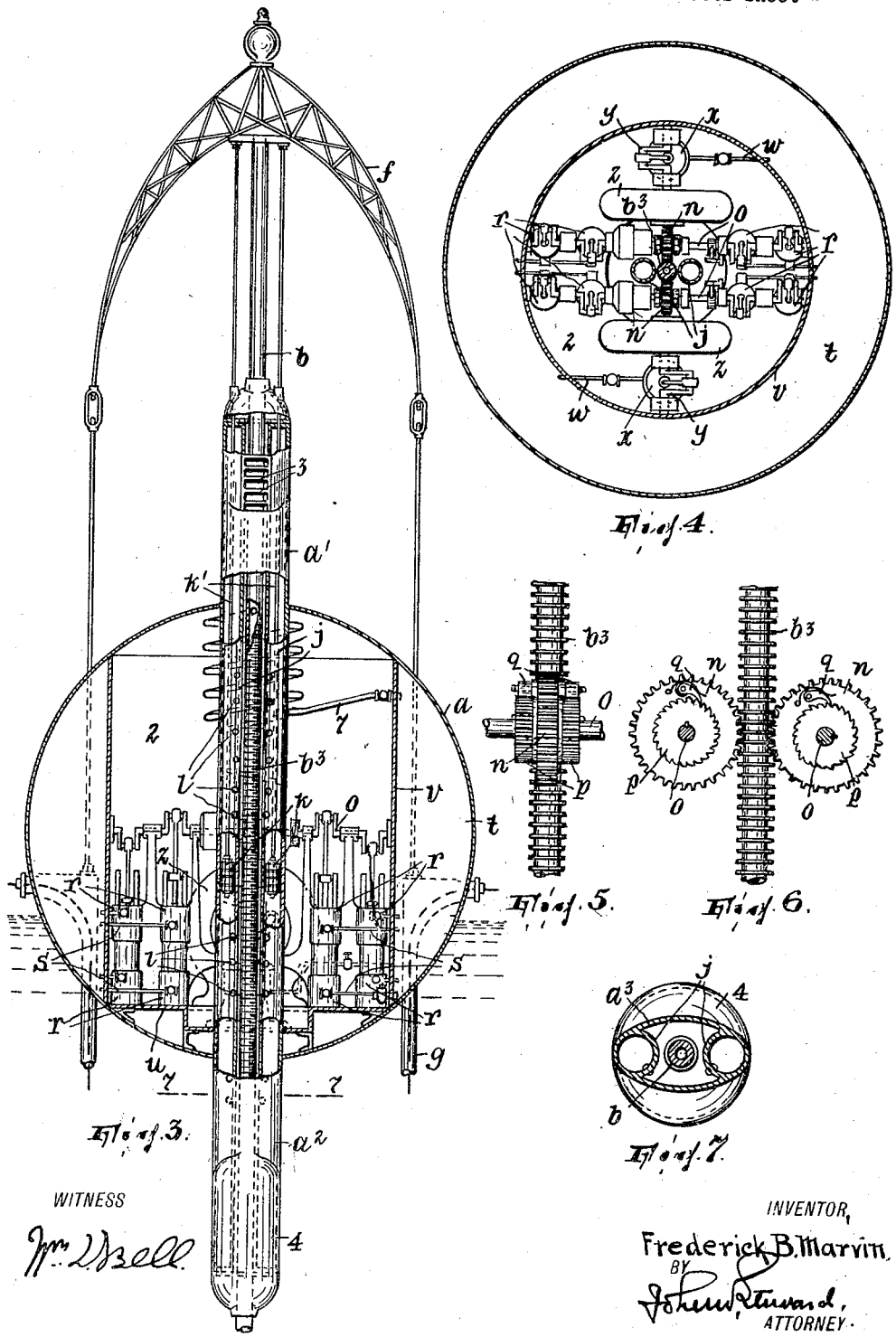
WITNESS
INVENTOR,
Frederick B. Marvin.
BY
ATTORNEY.

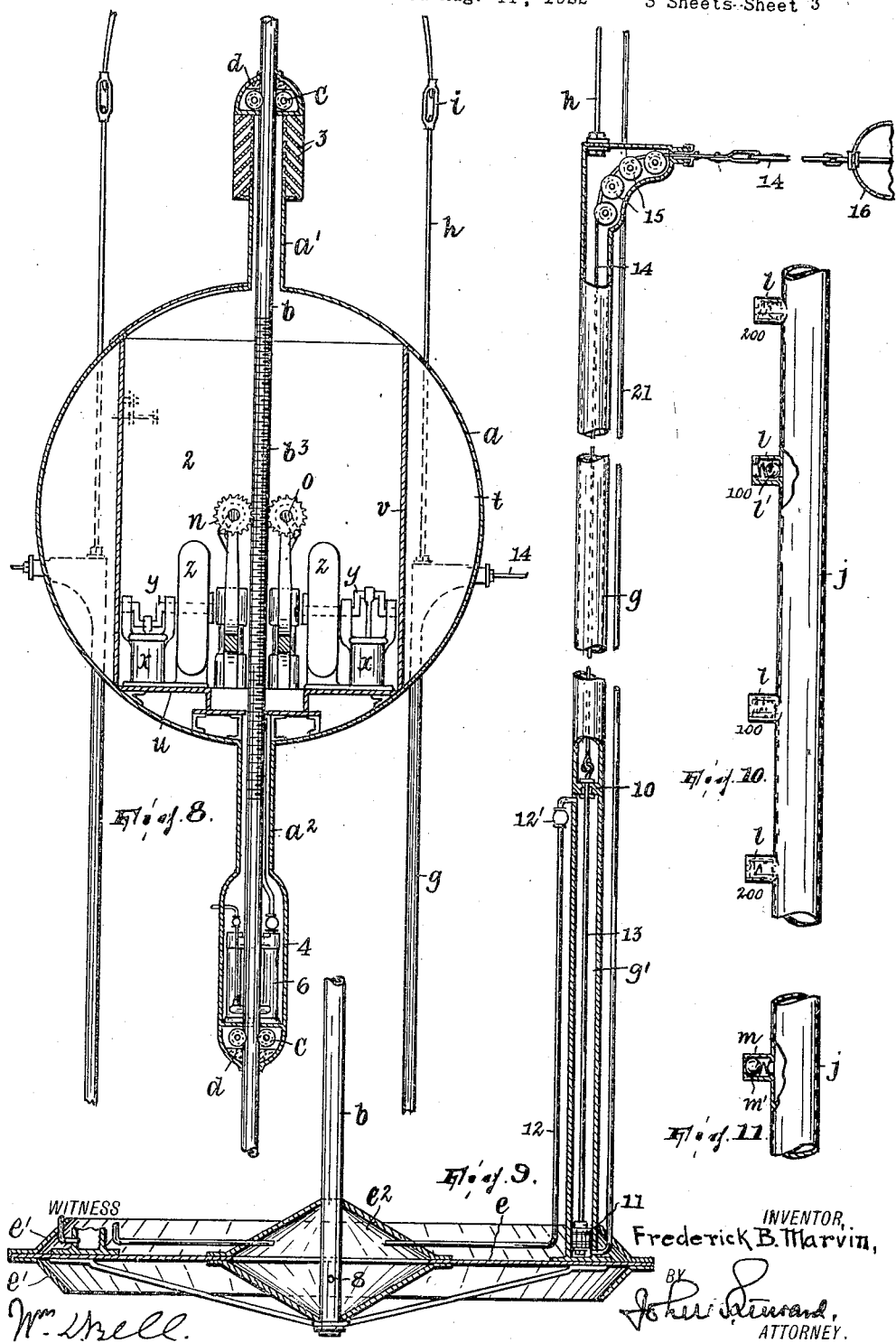

Patented July 22, 1924.

1,502,511

UNITED STATES PATENT OFFICE.

FREDERICK B. MARVIN, OF PORT JERVIS, NEW YORK.

WAVE MOTOR.

Application filed August 11, 1922. Serial No. 581,047.

*To all whom it may concern:*

Be it known that I, FREDERICK B. MARVIN, a citizen of the United States, residing at Port Jervis, in the county of Orange and State of New York, have invented certain new and useful Improvements in Wave Motors, of which the following is a specification.

This invention relates to wave motors and in particular to wave motors of the class wherein the wave-effected motion of a buoy or surface-floating body relatively to a constant-level floating body or stator is utilized in order to derive useful energy. In carrying out my invention I have devised an apparatus of this type which is calculated to possess the maximum amount of efficiency; is adapted to withstand the wear and tear not only of ordinary use but of that incident to violent wave action, as in the case of storms, so that it may remain uninterruptedly in service; and may be employed in gangs or "fields" so that a number of the apparatuses or units may be made to act in concert in converting the wave motion into useful energy.

In the drawings,

Fig. 3 is a view partly in side elevation and partly in vertical substantially central section of one of the apparatuses or motors;

Fig. 4 is a substantially central horizontal sectional view of what is shown in Fig. 3;

Figs. 5 and 6 are side elevations, viewed from points 90° apart, of the power transmission means;

Fig. 7 is a section on line 7—7, Fig. 3;

Fig. 8 is a vertical sectional view of the motor taken in a plane at right angles to the plane of section of Fig. 3;

Fig. 9 shows on a larger scale parts of the stator; and

Figs. 10 and 11 illustrate certain details.

Figure 1:
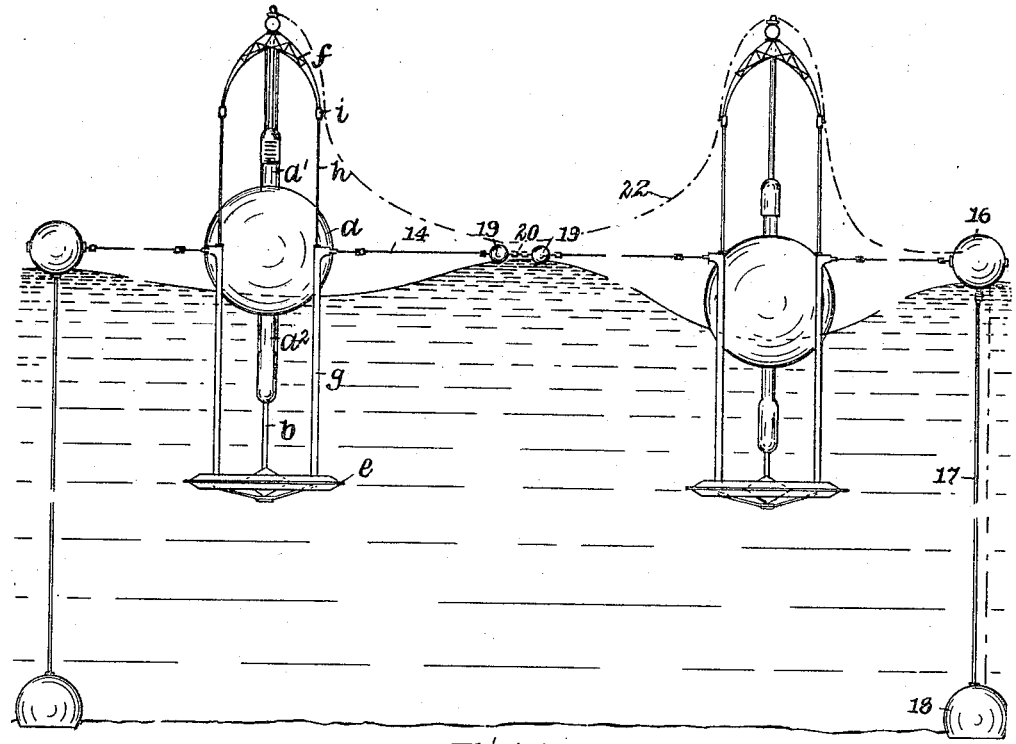
Fig. 1 is a side elevation showing two of a gang or "field" of the motors in use.

The surface-floating body or buoy is preferably a spherical hollow structure $a$ having top and bottom extensions or domes $a'$ $a^2$, such domes being designed to afford the maximum extent of motion to the buoy relatively to a certain rack contained within the same and forming a part of the stator, as will appear.

The stator includes a vertical shaft $b$, preferably tubular. This shaft extends through the sphere $a$ and its domes, being guided in the latter by anti-friction bearings $c$, there being preferably also packing at $d$. The stator also includes, fixed to the lower end of shaft $b$, a resistance member $e$ calculated to occupy a (substantially) constant-level submerged position when the motor is in use by virtue of said member being a disk, preferably with inturned top and bottom marginal flanges $e'$, and having a central chamber $e^2$ adapted to contain fluid (as air) at such pressure that while the entire apparatus stands upright in the water and the buoy is free to move up and down with the rise and fall of the waves the stator will not partake of such movement. The required fluid pressure in chamber $e^2$ may be maintained in any way, for example, as hereinafter explained. The stator structure, for the purpose of reinforcing it, may include a latticed or skeleton head $f$, which surmounts its shaft $b$, and tensioned connections between this head and the resistance member $e$, such connections being shown as tubular standards $g$ which are stepped on and rigidly secured to said member and cables $h$ having turnbuckles $i$. (For the mooring of the motor or a plurality of them these standards $g$ preferably perform other functions hereinafter to be set forth.)

My invention contemplates means for damping the motion of the buoy or float relatively to the stator, as follows: A pair of vertical cylinders $j$ extend through the sphere $a$, one each side of shaft $b$, their ends extending into the two domes $a^1$ and $a^2$. In each cylinder is a piston $k$ whose stems $k'$ extend through the upper ends of the cylinders and the dome $a'$ and are secured to head $f$. The position of the pistons when the buoy is at the neutral point or mid-position (the position of the buoy relatively to the stator when the surface of the water is at rest) is indicated in Fig. 3. At stages above and below the pistons when so positioned are vents $l$ from the cylinders to the interior of the sphere $a$. These vents have outwardly opening check valves $l'$ (Fig. 10) which, considering them successively upwardly or downwardly from the thus-positioned pistons, are graded so as to oppose successively increasing resistance to the escape of fluid (here, air) through the vents from the cylinders; i. e., the first valve above or below the piston may for example oppose 100 lbs. resistance, the next 200 lbs., etc. Thus there is afforded a pneumatic check to the rise and fall of the buoy, the shock of sudden upward or downward movement of the buoy being absorbed as an incident partly of the escape of the fluid and partly of its elasticity. Presence of a vacuum at the pressure side of the pistons incident to return of the buoy after movement either up or down and consequent expulsion of fluid in the cylinders at one or more of the vents is prevented by intakes $m$ (Fig. 11) arranged one (in each cylinder) above and the other below the two sets of vents, these having check valves $m'$ opening inwardly.

The motion of the buoy relatively to the stator may be converted into useful energy in any approved way. In the example illustrated the shaft $b$ is formed with a rack $b^3$ within the buoy with which at diametrically opposite sides of the shaft intermesh the pinions $n$ which are freely revoluble on crank-shafts $o$ suitably journaled within the buoy and have fixed thereon ratchet wheels $p$ with which engage pawls $q$ carried by the pinions, the arrangement of the pawls and ratchets being such that on motion of the buoy in either direction one shaft obtains a rotary impulse (see Fig. 6) always in the same direction. These crank-shafts may have connected to their cranks the pistons of a battery of air-compressors $r$ arranged to deliver, through pipe-systems $s$ (Fig. 3), into a compressed air chamber $t$. For supporting the compressors $r$ and other mechanism to be described and forming the chamber $t$ I construct in the buoy $a$ a floor $u$ and a cylindrical wall $v$ whose upper and lower margins meet the spherical wall of the buoy to produce said chamber. The air stored under pressure in chamber $t$ may be delivered through piping $w$ (Fig. 4) to air engines $x$ whose pistons are suitably connected with the cranks of crank-shafts $y$ which form the shafts of dynamos $z$ whereby electrical energy is developed. The load of the machinery represented by the compressors, air-engines and dynamos being supported at the base of the sphere serves to preserve the entire apparatus upright in the water. The air to be compressed and stored in the chamber $t$ is admitted to the space 2 enclosed within the wall $v$ through the upper dome $a'$; the air-admission openings in this dome are formed in the opposite sides of its enlarged upper portion, the openings being provided with slats or louvers 3 sloping outwardly and downwardly so that while admitting air water is prevented from washing into them. Water finding its way into the sphere collects in a sump 4 which is formed in the enlarged lower end portion of the dome $a^2$; from this sump it may be withdrawn from time to time, for example by any suitably operated pump 6 shown in Fig. 8. It will be understood that the motion of the buoy $a$ relatively to the stator may be converted into useful energy by any other means than that hereinbefore described and herein shown.

The compressed air in chamber $t$ is conducted to the tubular shaft $b$ by a flexible hose 7 (Fig. 3) and then down through the shaft and from the same via a port 8 into chamber $e^2$, the shaft being otherwise closed.

Usually the motors will be employed in sets of two or more; in any case each will be moored in some way. The mooring means for each motor (whether it be means individual thereto or means whereby it is connected to another motor or motors so as to be one of a set) I attach thereto so as to have a purchase thereon in proximity to the water-line, rather than above or below this point, so that the tug of the motor incident to wave, tide or current action will not be effective to shift it from its perpendicular position; and, in particular, I attach said mooring means to the stator which, since the stator has little up and down movement, reduces the wear and tear on the connections and facilitates the operation of coupling the motor with and uncoupling it from the mooring means. Further, the mooring means is so connected with each motor as to allow a certain amount of yield, thus to reduce the wear and tear on both incident to wave action, this being preferably accomplished by an air-cushion means adapted to oppose increasing resistance up to a certain point and then constant resistance. Describing these features in detail:

Each tubular standard $g$ forms between its lower end and a wall or head 10 a cylinder $g'$ containing a piston 11 which is normally held depressed by compressed air, the cylinder being in communication with chamber $e^2$ through a pipe 12. This pipe has an air-relief valve 12' which may be set to release the air when a predetermined pressure thereof is assumed, as by the piston being elevated in the cylinder. (This valve may be of the same construction as the already described valve $l'$—see Fig. 10). The stem 13 of the piston extends up through wall 10 and its upper end has attached thereto a flexible connection 14 which passes over guide-pulleys 15 in the upper end of the standard and then extends laterally. This connection may be attached to a buoy 16 connected by a flexible connection 17 with the anchor 18 or to another motor, in the latter case there being preferably a buoy 19 at the end of the connection 14 and each such buoy 19 having a suitable coupling 20 whereby to detachably connect it to another buoy 19.

Figure 2:
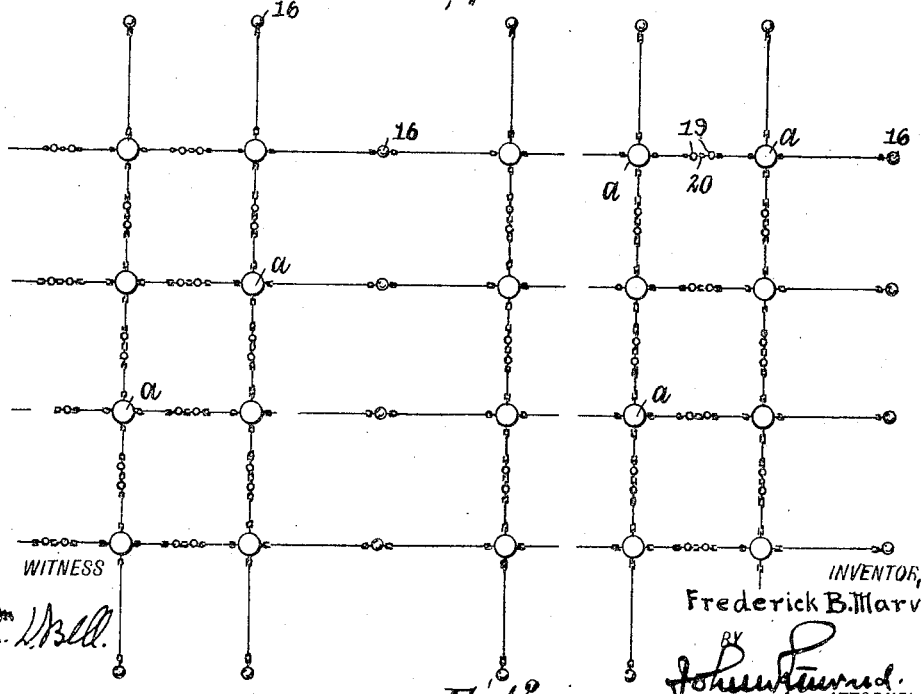
Fig. 2 is a plan of such a gang or field.

When there are a number of the motors in a set they may be connected up in some such way as is indicated in Fig. 2. Whenever a strain comes on the mooring connection of any motor, due to the latter tugging at the mooring, the resistance opposed by the head of compressed air in the system comprising $g'$, 12, $e^2$, $b$, and $t$ is yielding and at first elastic, to wit, until that degree of pressure is reached when the valve 12' yields, whereupon the pressure continues yielding but constant. A vacuum beneath the piston may be avoided by admitting atmospheric air via any suitable conductor 21.

It is of course not material what disposition is made of the energy developed, though it will be usually conveyed in some suitable way to land and there applied to some useful purpose. A cable 22 is shown in Fig. 1 for conveying the current developed by the dynamo to land.

Given a surface-floating structure which has its center of gravity below its metacenter, obtained in the present example by arranging the machinery contained in the spherical buoy $a$ below its center, it is an advantage to form said structure so that in substantially any cross-section it presents an exterior convex contour, since thereby the wave-action is rendered, as far as possible impotent to cause any other kind of movement of said structure, and hence of the motor as a whole, than the desired up and down movement of said structure relatively to the stator. The buoyancy of the surface-floating structure is of course increased by the charging of the buoy chamber $t$ with air.

Having thus fully described my invention what I claim as new and desire to secure by Letters Patent is:

1. A wave motor including a constant-level stator and a surface-floating structure operatively associated with the stator to move up and down relatively thereto and also including fluid compressing means to damp the thrust of said structure relatively to the stator.

2. A wave motor including a constant-level stator and a surface-floating structure operatively associated with the stator to move up and down relatively thereto and also including fluid compressing means to damp the thrust of said structure relatively to the stator, said means having means to release the contained fluid during such thrust progressively.

3. A wave motor including a constant-level stator and a surface-floating structure operatively associated with the stator to move up and down relatively thereto, the stator, including a submerged resistance member, an upright extending upwardly from said member through said structure and with reference to which the latter is movable up and down, and reinforcing means connecting the resistance member at points outward of the upright with the latter at a point above said structure.

4. A wave motor including a constant-level stator member, a surface-floating member operatively associated with the stator member to move up and down relatively thereto, the latter member including a submerged resistance member having a chamber for fluid under pressure, and means, carried by one of said members and actuated by the other on movement of the floating member relatively to the stator member, to deliver fluid into said chamber.

5. A wave motor including a constant-level stator, a surface-floating structure operatively associated with the stator to move up and down relatively thereto, the stator including a submerged resistance member, an upright extending upwardly from said member through said structure and with reference to which the latter is movable up and down, and reinforcing means connecting the resistance member at points outward of the upright with the latter at a point above said structure, and means to which to moor the motor attached to said reinforcing means in proximity to the water-line.

6. A wave motor including a constant-level stator and a surface-floating structure operatively associated with the stator to move up and down relatively thereto, and means to hold the motor against lateral displacement including floating members arranged in different radii from said motor, flexible connections extending from the motor to the respective members substantially without deviation and means to moor each floating member.

7. A wave motor including a constant-level stator and a surface-floating structure operatively associated with the stator to move up and down relatively thereto, and means to hold the motor against lateral displacement including floating members arranged in different radii from said motor, flexible connections extending from the motor to the respective members substantially without deviation and each attached to the stator of the motor and means to moor each floating member.

8. A wave motor including a constant-level stator and a surface-floating structure operatively associated with the stator to move up and down relatively thereto, and means to hold the motor against lateral displacement including floating members arranged in different radii from said motor, flexible connections extending from the motor to the respective members substantially without deviation and each attached to the stator of the motor approximately at the water-line and means to moor each floating member.

9. A gang of wave motors each including a constant-level stator and a surface-floating structure operatively associated with the stator to move up and down relatively thereto, in combination with flexible connections respectively connecting each motor with a plurality of the other motors and each extending from one to the other motor substantially without deviation and means to which to moor the gang of motors.

10. A wave motor including a constant-level stator and a surface-floating structure operatively associated with the stator to move move up and down relatively thereto, said motor having fluid compressing means, and means to which to moor the motor attached to the moving member of the compressing means.

11. A wave motor including a constant-level stator and a surface-floating structure operatively associated with the stator to move up and down relatively thereto, said stator having fluid compressing means, and means to which to moor the motor attached to the moving member of the compressing means.

12. A wave motor including a constant-level stator and a surface-floating structure operatively associated with the stator to move up and down relatively thereto, in combination with elastically extensible means attached to the motor for mooring the same.

13. A wave motor including a constant-level stator structure and a surface-floating structure operatively associated with the stator structure to move up and down relatively thereto, one of said structures having a chamber for fluid under pressure, and means, carried by one of said structures and actuated by the other, for charging said chamber with fluid.

In testimony whereof I affix my signature.

FREDERICK B. MARVIN.